R. T. HILL.
NUT LOCK.
APPLICATION FILED JAN. 22, 1921.
1,391,186. Patented Sept. 20, 1921.
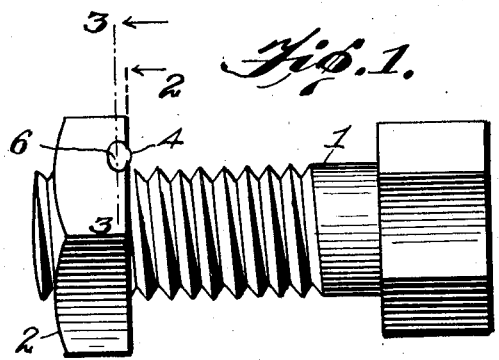
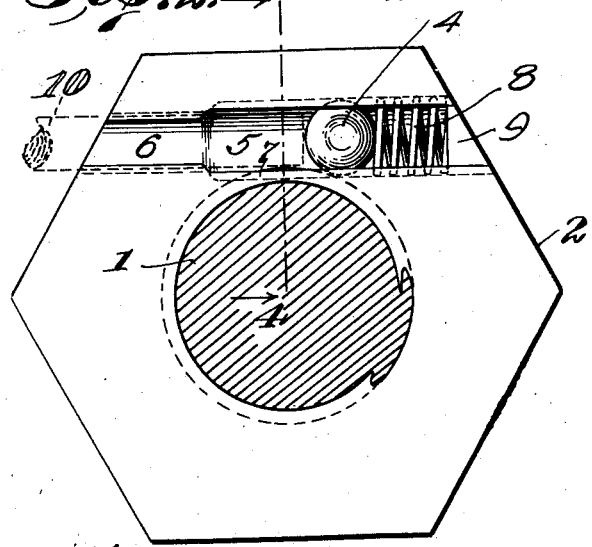
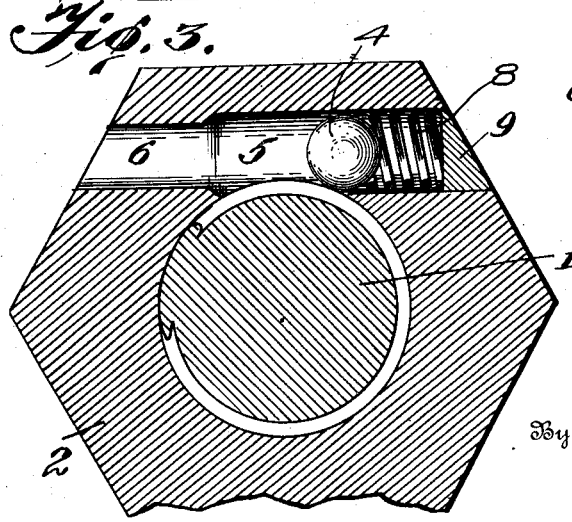
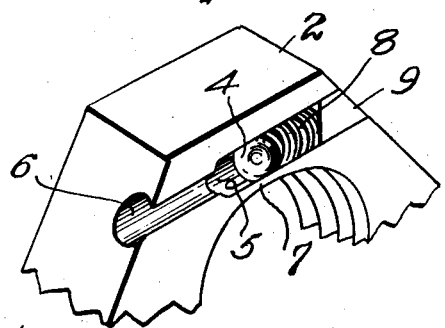
Inventor
Raymond T. Hill.

UNITED STATES PATENT OFFICE.

RAYMOND T. HILL, OF DETROIT, MICHIGAN.

NUT-LOCK.

1,391,186.     Specification of Letters Patent.     Patented Sept. 20, 1921.

Application filed January 22, 1921. Serial No. 439,155.

*To all whom it may concern:*

Be it known that I, RAYMOND T. HILL, a citizen of the United States, residing at Detroit, in the county of Wayne and State of Michigan, have invented certain new and useful Improvements in Nut-Locks, of which the following is a specification, reference being had therein to the accompanying drawings.

This invention relates to improvements in nut locks, and has for its object the construction of a nut lock that is provided with novel means for more tightly or positively locking the nut upon the bolt as it is turned toward its locked position upon the bolt, against a surface.

Another object of the invention is the construction of a nut lock, including a nut which is provided with open side pockets, in one of which is a locking ball that protrudes slightly from the pocket in which it is positioned, whereby the ball will have a frictional contact against the engaged surface for more positively forcing the ball against the threads of a bolt if the bolt should tend to unloosen.

With these and other objects in view, my invention comprises certain novel combinations, constructions and arrangements of parts as will be hereinafter described, illustrated in the accompanying drawings, and more particularly pointed out in the appended claims.

In the drawings:

Figure 1 is a view in side elevation of a bolt and a nut constructed in accordance with the present invention.

Fig. 2 is a view in elevation taken on line 2—2, Fig. 1, and looking in the direction of the arrows.

Fig. 3 is an enlarged sectional view taken on line 3—3, Fig. 1, and looking in the direction of the arrow.

Fig. 4 is a sectional view taken on line 4—4, Fig. 2, and looking in the direction of the arrows.

Fig. 5 is an enlarged fragmentary perspective view of the improved nut.

Referring to the drawings by numerals, 1 designates the threaded bolt, upon which the nut 2 is mounted. 3 (Fig. 4) is the engaged surface, or the support, carrying the bolt 1, and against which surface or support 3 the locking ball 4 frictionally contacts.

The locking ball 4 is movably mounted in the large primary pocket 5, which pocket 5 opens at one end into the auxiliary small pocket 6. Bridging the bolt 1 is a bridge piece 7, upon which the ball 4 travels; when the nut 2 is removed from the bolt 1, by reason of this bridge piece 7, the locking ball 4 will not fall out of the primary pocket 5. A portion of the locking ball 4 projects beyond the inner face of the nut 2, as clearly seen in Figs. 1 and 4, whereby, as the nut 2 is turned tightly upon the bolt 1, against a surface or support 3, the ball 4 will be more tightly forced or jammed against the surface or support 3, carrying the bolt 1, so that if the bolt should tend to unloosen the frictional contact would tend to force the ball into wedging contact with the threads of the bolt to prevent this action. This frictional contact will also hold the nut against accidental movement.

A coil spring 8 is interposed between the ball 4 and the plug 9, for causing the ball 4 to have a tendency to move toward the inner end of the auxiliary pocket 6, whereby the ball has a tendency to move to a locking position upon the threads of the bolt, but the protruding portion of the ball, through the side-opening of the pocket (Figs. 1 and 4) causes the ball to contact with the support 3, for the purposes above set forth.

If the nut is not screwed up against a support, but must be held upon the bolt, the spring 8 will hold the ball 4 against the threads of the bolt 1, so that if the bolt and nut should tend to unloosen, the ball will be forced into wedging contact with the threads of the bolt and thereby prevent the nut from disengaging the bolt. It is also apparent that at this time the bridge piece 7 will hold the ball against side displacement, although allowing of access to the interior of the pockets, as above set forth.

The plug 9 closes the outer end of the primary pocket 5, thereby retaining the spring securely within the pocket.

A suitable tool or instrument, as shown by dotted lines 10, Fig. 2, can be inserted into the auxiliary pocket 6 for pushing back the ball 4, thereby disengaging the same from the threads of the bolt 1, permitting the nut to be quickly unscrewed off the bolt.

Additional advantages are obtained by the side-opening structure of the pockets 5 and 6 and they are that the pockets can be perfectly cleaned while the operator is looking at the entire contents of the pockets, and further the pockets can be efficiently lubricated to facilitate movement of the spring and ball, or can be washed with, for instance, kerosene, (the operator viewing this operation at all times), to prevent rusting of the spring or ball in the pockets.

What I claim is:

1. In a device of the class described, the combination with a bolt provided with threads, of a nut on the threads of said bolt, said nut provided with a pocket formed in its side, said pocket provided with a side-opening, a ball in said pocket and having a portion projecting through the side-opening thereof, and said ball engaging the threads of the bolt as and for the purposes set forth.

2. In a device of the class described, the combination with a bolt provided with threads, of a nut mounted upon the threads of the bolt, said nut provided in its inner side-face with a primary and an auxiliary pocket, said pockets each having an open side, said primary pocket provided with a bridge piece at its inner portion spanning the threads of the bolt when the nut is placed thereon and constituting a ball trackway, a ball in said primary pocket engaging the bridge piece and having a portion projecting through the open side, means normally forcing the ball toward the inner end of the primary pocket, as and for the purposes set forth.

3. In a device of the class described, the combination with a bolt provided with threads, of a nut mounted upon the threads of said bolt, said nut provided with a pocket formed in one of its sides, said pocket provided with a bridge piece, a spring-pressed locking ball in said pocket and traveling upon said bridge piece, and a portion of said ball being exposed for frictional contact with an object for moving the ball positively in said pocket independent of the action of the spring on the ball.

In testimony whereof I hereunto affix my signature.

RAYMOND T. HILL.